United States Patent [19]

Krüger et al.

[11] Patent Number: 4,868,812
[45] Date of Patent: Sep. 19, 1989

[54] SHARED LINES EQUIPMENT, ESPECIALLY FOR B-ISDN SWITCHING SYSTEM

[75] Inventors: Johann E. W. Krüger, Quickborn; Ulrich R. P. Killat; Wolfgang E. Jasmer, both of Hamburg, all of Fed. Rep. of Germany

[73] Assignee: U.S. Philips Corporation, New York, N.Y.

[21] Appl. No.: 192,814

[22] Filed: May 11, 1988

[30] Foreign Application Priority Data

May 13, 1987 [DE] Fed. Rep. of Germany ....... 3715885

[51] Int. Cl.⁴ ........................................... H04Q 11/00
[52] U.S. Cl. ..................................... 370/56; 370/85.1
[58] Field of Search .................. 370/58, 56, 85, 110.1; 340/825.5; 379/333, 334

[56] References Cited

U.S. PATENT DOCUMENTS

| 3,728,492 | 4/1973 | Cappetti et al. | 370/56 |
| 4,320,501 | 3/1982 | LeDieu et al. | 370/63 |
| 4,559,624 | 12/1985 | Roos et al. | 370/56 |
| 4,594,704 | 6/1986 | Ollivier | 370/56 |

OTHER PUBLICATIONS

H. Petasch, "Modular aufgebaute digitale Vermittlungszentrale mit verteilter Steuerung", Nachrichtentech., Elecktron., Berlin 35(1985)2, pp. 43-44.

Th. Krol, "The (4,2) Concept Fault-Tolerant Computer", Philips Technical Review, vol. 41, 1983/84, No. 1, pp. 1-11.

Primary Examiner—Joseph A. Orsino
Assistant Examiner—Frank M. Scutch, III
Attorney, Agent, or Firm—Thomas A. Briody; Jack E. Haken; Anne E. Barschall

[57] ABSTRACT

Large-scale time-division switching arrangements often consist of a central switching network and a series of so-called concentrators. For establishing an H1 switching a series of wideband concentrators are connected to a central wideband switching network if the wideband concentrators are of a modular structure and communicate through an internal bus system and an interface circuit with the central wideband switching network connected thereto, a distribution switching in the direction of the subscriber station and a testing of the concentrators while in operation can be effected in a simple way.

16 Claims, 4 Drawing Sheets

SHARED LINES EQUIPMENT, ESPECIALLY FOR B-ISDN SWITCHING SYSTEM

BACKGROUND OF THE INVENTION

1. Field of the Prior Art

The invention relates to shared lines equipment (Vorfeldeinrichtung), especially for a B-ISDN switching system having subscriber stations, wideband concentrators, and a central wideband switching network.

2. Prior Art

A large-scale time-division switching arrangement often consists of a central switching network and a series of so-called concentrators, which are connected to the in/outputs of the central switching network. The concentrator is a shared lines equipment (Vorfeldeinrichtung), effecting a concentration of the traffic offered. For the subscriber stations connected to the concentrator there is nonzero loss on average. The number of junction lines between the concentrator and the switching arrangement can be determined such, that the handling of the traffic offered by the subscriber stations connected to the concentrator is affected only insignificantly. In practice, this means that the number of the subscriber stations to be connected to the concentrator with a predetermined loss must not exceed a certain limit.

For the subscriber stations connected through the concentrator it is disadvantageous that a wiring of the concentrator with lines having different traffic volumes has a negative effect on the operating conditions. Therefore, a system structure is often conceived, in which a division of the switching arrangement is made, especially in a B-ISDN switching system, into a narrow band and a wideband portion. Both portions consist of the central switching network with inserted concentrators. The switching arrangement comprises a common control arrangement, which supplies adjusting and control information to the concentrators through an associated interface circuit.

From Nachrichtentechnik-Elektronik, 1985, Vol. 2, pp. 43 and 44 a digital switching exchange of a modular configuration is known having a distributed control for the through-switching of narrow band channels. For different applications the digital switching exchange has various types of modules, for example, transit modules and concentrator modules. These shared lines equipments communicate with each other over a central bus operating in the time-division mode, the communication data being transmittd between the modules according to the principle of the line storage and the process data in the framework of speech communication being transmitted in the respective time slots in the parallel mode over the process bus.

The concentrator module has a concentrator stage, a microcomputer control, an interface unit, a time-directional coupler and a bus interface.

The transmission in such a system configuration via a B-ISDN switching system is very expensive in the concentrators, especially because the concentrators have their individual microcomputer controls which have to communicate with each other for switching the connections through over the bus system operating in the time-division mode.

Consequently, as already explained hereinbefore for an H1 switching, a central wideband switching network for 1024 2 Mbit/s channels, for example, can be provided to which up to 16 wideband concentrators can be connected.

The wideband concentrators do not affect an internal switching, that is to say, without the help of the central wideband switching network no switching takes place between the connected groups of subscribers. All data reaching a wideband concentrator through a highway H1 (H2), leave it again through a highway H2 (H1).

A highway H is a bidirectional multiplex connection via which N channels are conveyed each time. For example, the transmission rate of the connection line between the central wideband switching network and the wideband concentrator is 139.264 Mbit/s with a word clock of 17.408 MHz. This is equal to a multiplex frame of 68 time slots of 2.048 Mbit/s each, whereas in the above case only 64 time slots are switchable. The remaining four time slots are reached through the special-purpose control interface circuit. The multiplex frame on the line of the subscriber group has, for example, 34 time slots. Four H1 channels from these time slots are allocated to each subscriber for wideband and $\frac{1}{8}$ H1 channel (equal to 256 kbit/s) for narrow band, whilst the clock synchronization of the two systems is effected via one common clock, whereas, on the other hand, the switching of narrow band and wideband data channels is effected entirely separately.

In the system configuration depicted hereinbefore, each concentrator contains 16 concentrator time-stage modules, which are each time allocated to a group of 8 subscribers. The concentration factor is then 8. According to the (4,2) concept known from the DE-OS 35 37 451, four data bits are transmitted in parallel and bidirectional per time slot.

Each concentrator time-stage module has four bidirectional time stages for switching 34 2 Mbit/s channels, enabling in the system configuration described above the switching of 8* (4H1) channels of one group (as well as two 2 Mbit/s channels bundling narrow band channels) onto the 68 channels, which are available in a time-division multiplex frame.

SUMMARY OF THE INVENTION

The invention has for its object to arrange a shared lines equipment such that a distribution service is made possible in the direction of the subscribers. Furthermore, it should be possible to monitor the shared lines equipment during operation and also guarantee the clock synchronization of the four bidirectional time stages of each concentrator time-stage module.

This object is achieved according to the invention by means of a shared lines equipment in which the shared line equipment includes wideband concentrators of a modular structure, which communicate via an internal bus system and an interface circuit with the central wideband switching network connected thereto.

The shared lines equipment according to the invention is advantageous in that in a surprisingly simple manner the bit clocks and frame clocks such as data signals coming from the central wideband switching network can be processed by means of an interface circuit. A further advantage is the fact that due to the modular structure of the wideband concentrators a preparatory operation has already been carried out in this respect, so that when one of the modules fails, it can be exchanged in a simple and fast way. If the internal bus system is arranged as a serial bus, the latter can have a symmetrical design for noise suppression and a small number of lines will be required.

The arrangement according to the invention may also include a connector module having two emory banks connected to the bus system via a series-to-parallel converter and a parallel-to-series converter, respectively. The memory banks also communicate via an H1 interface with a subscriber group circuit. During each frame period, data are written into only one of the memory banks and data are read out from the other memory bank. This arrangement is advantageous in that the data coming from the central wideband switching network can be switched to a plurality of subscribers in the sense of a distribution service. Furthermore, it is advantageous in that the speed can be enhanced in a simple way. Contemporary standard memory banks have a minimum access time of approximately 14 ns which is inadequate for time-division switching by means of the memory banks at the said high data transfer rates.

The memory bank may also be doubled This is advantageous in that the reliability is enhanced.

In a further arrangement of the shared lines equipment the data coming from the bus system (RB) is written into one memory bank (A) in a counter addressed mode and is read out in an addressed mode by a control circuit (ST) arranged in a concentrator module (C) with a clock reduced by an integral factor. This is advantageous in that it requires little circuitry and design effort for realizing the function of distribution switch.

In a still further arrangement of the shared lines equipment bus access circuit (B-SE) is arranged in the cncentrator module (C), which circuit controls the access of the concentrator module (C) to the bus system. This avoids in a simple manner that a plurality of concentrator modules simultaneously access the internal bus system.

In yet a further arrangement of the shared lines equipment loop circuit (S-OE) is arranged in the concentrator module (C), which circuit controls a switch (S) connected to two memory banks (A, B). In this way, data coming from the central wideband switching network can be switched back, so that a remote controlled monitoring of the shared lines equipment during operation is enabled.

In another arrangement an elastic store loop circuit (S-OE) is arranged in the concentrator module (C), which circuit controls a switch (S) connected to two memory banks (A, B). In this way, the frame synchronization of data flowing in both directions between the central wideband switching network and the wideband concentrator is ensured in a simple way even with different lengths of the junction lines.

In yet another arrangement of the shared lines equipment a delay element (V) is inserted between memory banks (A,B). This is advantageous in that also means from the optical communications technique can be used. The optical conductor monitoring for line fracture can be realized by transmitting the free signal.

In still another arrangement, between the two memory banks a delay element is inserted, the disturbance of data that have already been switched cannot possibly occur during a further switch operation.

The invention can be arranged according to the (n, k) concept, for which it comprises k interface circuits (H2i) and k internal bus systems (RB). Thus the transmission path between the central wideband switching network and the wideband concentrator is protected and an error can be corrected in a simple way. As the (n,k) concept is implemented in the wideband concentrators, the defective concentrator module can be exchanged for repair without the need to switch off the shared lines equipment.

The invention can be arranged with a clock synchronization circuit (TS) connected to the internal bus system (RB), which circuit comprises a free-running start-stop oscillator (O) and gate and trigger circuits connected thereto. Accordingly, an exact clock synchronization is ensured in a simple way with regard to the (n, k) concept employed.

BRIEF DESCRIPTION OF THE DRAWING

Further arrangements of the shared lines equipment according to the invention are described herein.

The invention will be further explained and described with reference to various embodiments shown in the drawing, in which.

In the structure of a B-ISDN switching system as shown in

DETAILED DESCRIPTION OF THE PREFERRED EMBODIMENTS

Figure 1:
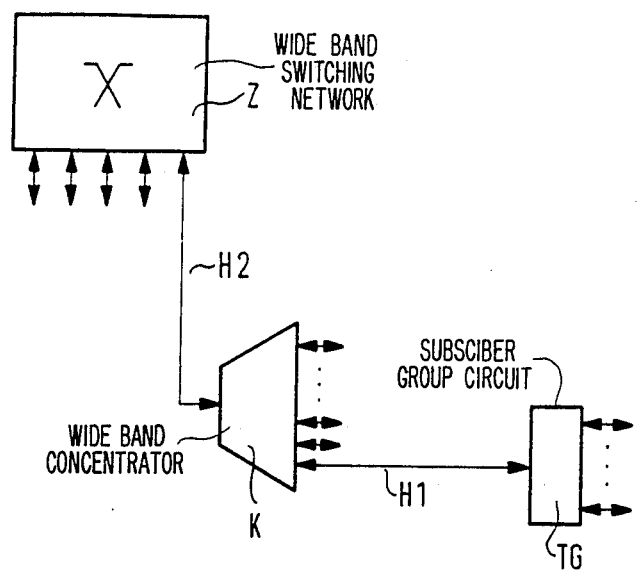
FIG. 1 shows the structure of a B-ISDN switching system.

FIG. 1 it is assumed that there is only one highway H2 per wideband concentrator K. The shared lines equipment according to the invention can be characterized as follows:

M highways H1 (M=16) cn be connected.

The number N1 of time slots on a highway H1 is a (preferably integral) divisor of the number N2 of time slots on the highway H2 (N1=34; N2=68).

The wideband concentrator K which uses the same time slot numbers for both directions of a bidirectional connection, can divide the connection such that the data coming through the highway H1 (H2) are looped back to the source.

Channels coming through the highway H2 can in the sense of distribution switching be switched onto a plurality of channels in all highways. In a non-switched channel the subscriber receives a specific free signal.

The wideband concentrator has a modular structure and has M concentrator modules C assigned to the individual highway H1.

The wideband concentrator K can easily be made fault-tolerant according to the (4,2) concept.

Arrangements, especially in the switching system, which are not required for comprehending the invention, have not been shown in the structure represented in FIG. 1, but in the direction of the trunk connections oly the central wideband switching network Z is shown and in the direction of the subscribers the subscriber group circuit TG is shown.

Figure 2:
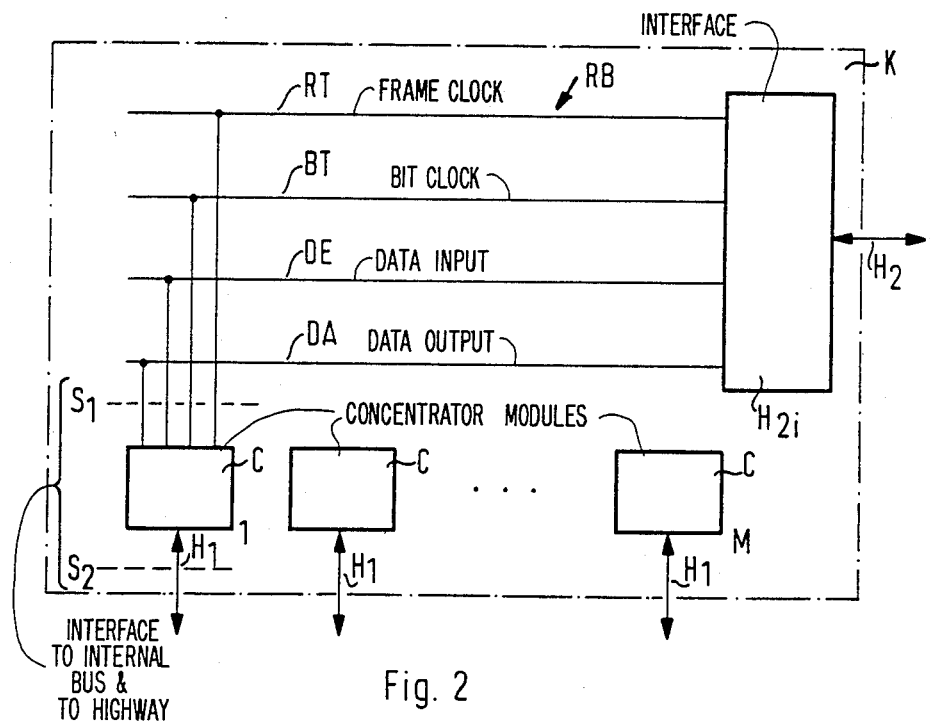
FIG. 2 shows an embodimnt for the structure of the wideband concentrator.

FIG. 2 shows an embodiment for the wideband concentrator K according to the invention. The wideband concentrator K comprises M identical concentrator modules C as well as an interface circuit H2i. The interface circuit H2i forms the interface between the highway H2 and the internal bus system RB, through whose lines the frame clock RT, bit clock BT as well as data input DE and data output DA are made available. A concentrator module C operates a highway H1 and from the point of view of the modular technique and is preferably realized as a printed circuit board. In this case the wideband concentrator K is characterized by a slide-in unit having rear wall wiring and no less than M+1 plug-in positions. The interfaces to the internal bus system RB and highway H1, respectively, are denoted $S_1$ and $S_2$.

The function of the concentrator module C is further described and explained hereinafter with reference to FIG. 3. The concentrator module C, in an embodiment described above, comprises the interfaces $S_1$, $S_2$ and a control interface $S_3$ for receiving the adjusting information coming from the central wideband switching network Z.

The data transfer from the interface $S_1$ to the interface $S_2$ is effected via a memory bank A and in the opposite direction via the memory bank B. There is a dual arrangement of memory banks A and B only one portion, which changes with each frame clock, of the memory banks A and B, respectively, is written whilst the other portion is only read out. Thereby, it is avoided that the write and read clocks (determined by an unfavourable ratio of $N_2:N_1$) cause the access to a storage cell to be simultaneous for reading and writing. The data coming from the interface $S_1$ ($N_2$, for example 68 time slots (typically) 8 bits) are written in a counter-addressed mode and read out in an addressed mode with a clock reduced by the factor $N_2/N_1$ by a control circuit ST arranged in the concentrator module C.

Because the incoming data are temporarily stored in the memory bank A, the switching function in the direction from the interface $S_1$ to the interface $S_2$ realized in the above way enables a distribution switching, that is to say the same storage contents can be read out repeatedly in accordance with the control circuit ST. In the opposite direction, that is to say, from the interface $S_2$ to the interface $S_1$, it is read out in a counter-addressed mode what was previously addressed written by the control circuit ST. Because the two memory banks A, B with the same control contents are addressed by the control circuit ST, a pairing occurs of identical time slot numbers for both directions of a bidirectional connection.

As a plurality of concentrator modules C access the internal bus system RB, only the switched memory positions of a module C may be presented through the bus line DA. For this purpose a bus access circuit B-SE is arranged in the concentrator module C, into which circuit a signal with the logic "1"-level is entered for the relevant memory location (time slot). Memory locations which are then not used for a switching operation—and this also includes distribution switching connections which are not bidirectional—are identified with a logic "0" - level by the bus access circuit B-SE.

One of the incoming time slots, for example the one having the address O, contains a free signal. This free signal is transmitted in the sense of a distribution switching to the subscribers for all established connections. Consequently, there is no "dead" (informationless) channel for the subscriber and especially when using optical conductors a fracture in the line can easily be recognized.

Concentrator module C further includes a loop circuit S-OE, controlling a switch S connected to the two memory banks A, B. By means of the loop circuit S-OE the switch S can be made to assume for each switched time slot one of the two positions:

Through-switching, that is to say, a connection in the direction from the interface $S_1$ to the interface $S_2$.

Opening of the connection and looping back of the data to the relevant source.

If the data are looped back, the control signals for the memory bank A can be delayed by the same amount as the data passing through the switch S. For this purpose a delay element V is inserted between the memory banks A and B, which is preferably realized by a series of D flipflops. The phase conditions for the frame clock at switch S can also be forced upon the data coming from the interface $S_2$ in the other switch position (through-switching). This requires a buffering of no more than one frame.

Furthermore, for outgoing and incoming data the concentrator module C comprises on the junction line to the central wideband switching network a serial-to-parallel converter S/P and a parallel-to-serial converter P/S. The adjusting information for the concentrator module C coming in via the control interface $S_3$ is applied to a clock processing circuit TA, to which are further applied the bit clock BT and the frame clock RT. The clock processing circuit TA transfers the processed signals to the respective arrangements of the concentrator module C. For controlling the switch S a control SS connected to the loop circuit S-OE and the clock processing circuit TA can further be arranged in the concentrator module C. In such an arrangement the loopo circuit S-OE is designed as a memory, in which the signals are stored coming in via the control interface $S_3$ and clock processing circuit TA.

Figure 4:
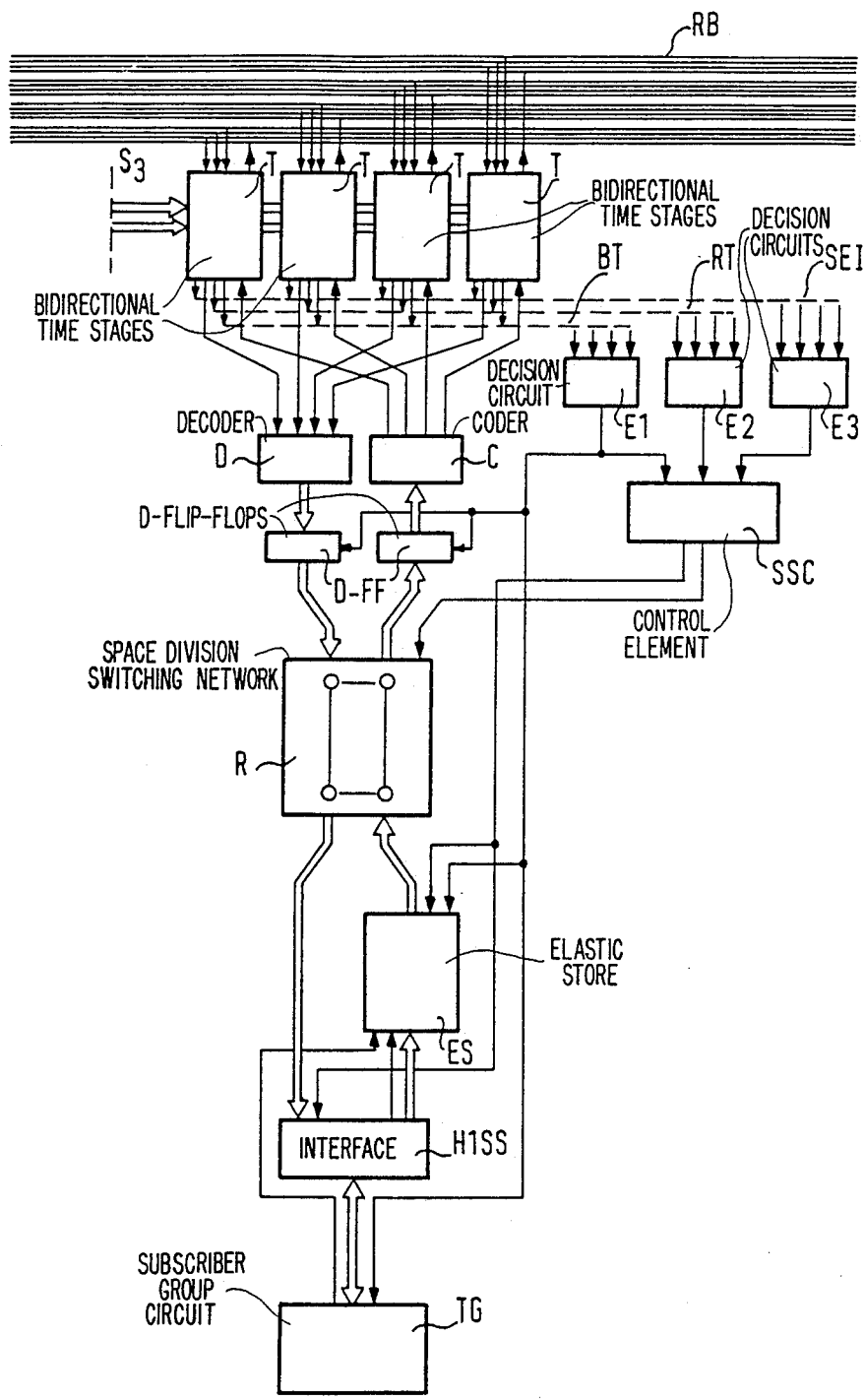
FIG. 4 shows a further embodiment for a wideband concentrator arranged according to the (4,2) concept

FIG. 4 shows a further embodiment for the concentrator module C, in which also the latter is protected, as is the switching arrangement, according to the known (4,2) concept. In this embodiment the central switching arrangement and the transfer arrangement of a highway $H_2$ consist of four independent failure units. Cnsequently, the concentrator module C in this environment comprises four modified interface circuits H2i and four internal bus systems RB to which are connected four bidirectional time stages T. The four time stages T are arranged in parallel due to the (4,2) concept. The decoding is effected in the decoder subsequent to the data switching.

As has already been explained hereinbefore, the concentrator time stage T can reach all 68 time slots, only 64 of which can be switchhed in the central wideband switching network Z. Thus, in one of the four free time slots a centrally generated free signal can be transferred and switched to any subscriber. A specific time slot carries the adjusting information in the form of a data stream, preferably four times the logic "0"-level for representing a logic "0"-level and four times a logic "1"-level for representing a logic "1"-level, respectively. This enables a uniform data representation for all four (4,2) plates according to the (4,2) concept.

Figure 3:
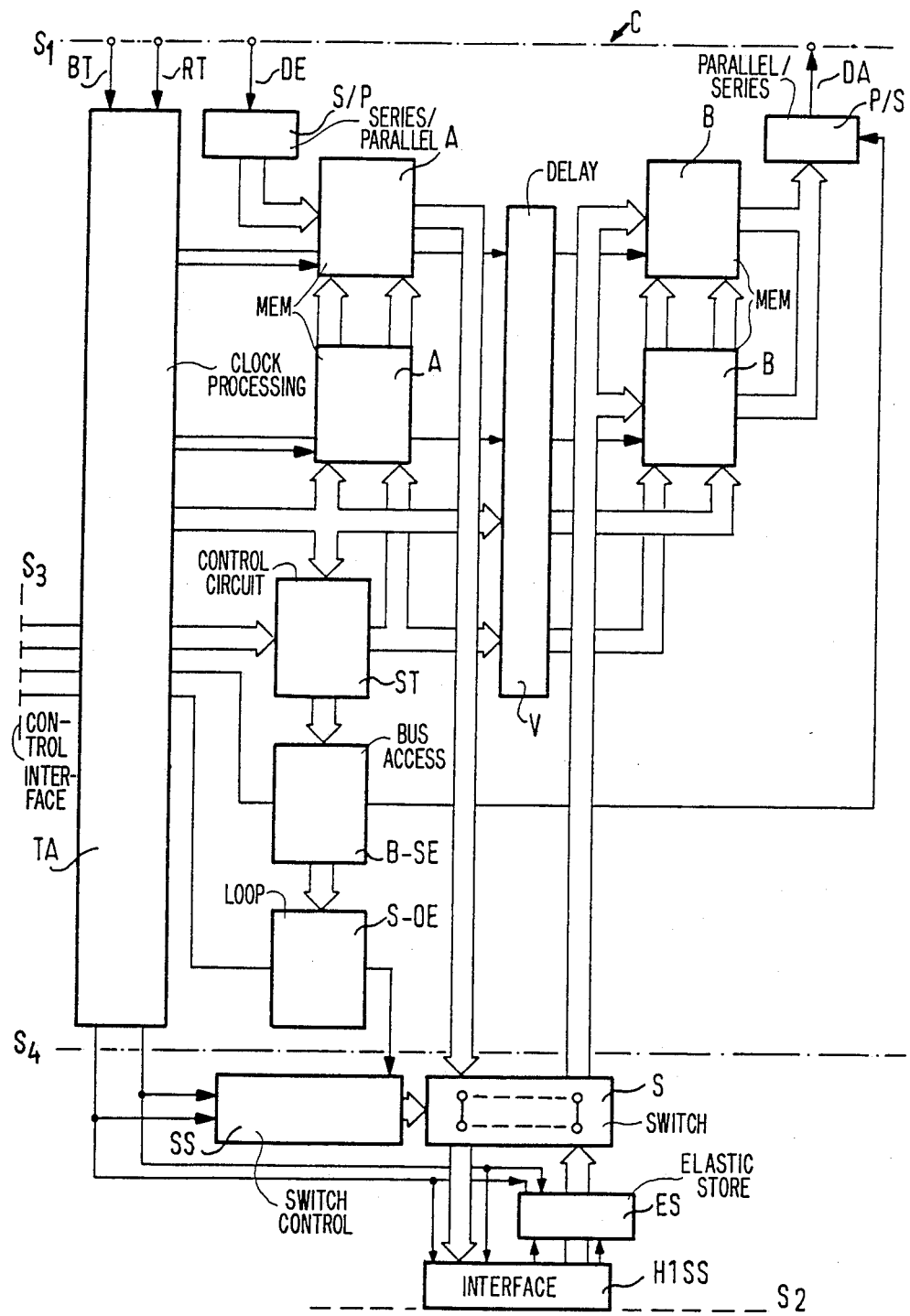
FIG. 3 shows an embodiment for a concentrator module.

From the bit clock BT, word clock and frame clock RT, respectively, of all four concentrator time stages T, a majority decision is derived by means of the respective decision circuits E1, E2, and switched to the subscriber group circuit TG as "average" clocks. A specific signal SEI has for its aim with non-switched time slots, to switch a space-division switching network such that either the switching through of data is interrupted or a test loop is formed. The associated control arrangement for the space-division switching network is denoted SSC in FIG. 4. This space-division switching network separates also controlled by the frame-clock the time slots 0 (ISDN-NB data) and the time slots 1 (possible distribution services) on the subscriber group line from the wideband data stream. As regards the operation the spacedivision switching network R can be considered to be eqivalent to switch S (in FIG. 3). In a further switch position (not shown in the drawing) the error counting positions of the (4,2) error decoder can be returned to the central wideband switching network Z in the unused time slots 0 and 1 and evaluated. By means of the D flipflop D-FF the data stream in the frame phase is adapted to the delay element V (decreased accumulation of the propagation delay). As appears from the above description, the concentrator time stages T are to a large extent identical with the concentrator modules C described with reference to FIG. 3. The following differences have to be considered:

the provided memory banks according to the (4,2) concept have only a depth of four bits (instead of eight bits).

the concentrator time stage T already ends at the interface $S_4$ instead of the interface $S_2$ (cf. FIG. 3).

At the interface $S_4$ the respective coder C and decoder D are inserted to terminate the (4,2)-protected area. Outside this area the circuit shown in FIG. 4 corresponds with the circuit between the interfaces $S_4$ and $S_2$ represented in FIG. 3.

In an arrangement of the concentrator K according to the (4,2) concept, four interface circuits H2i are required. They form the interface between one of the four bus systems RB and one of the four "sub-highways" $H_2$. The concentrator time stages T have to have exact synchronization so that the coder C and decoder D as to their function operate error-free. For this purpose the four interface circuits H2i have to furnish their associated bus systems RB with synchronous frame and bit clocks RT and BT.

Figure 5:
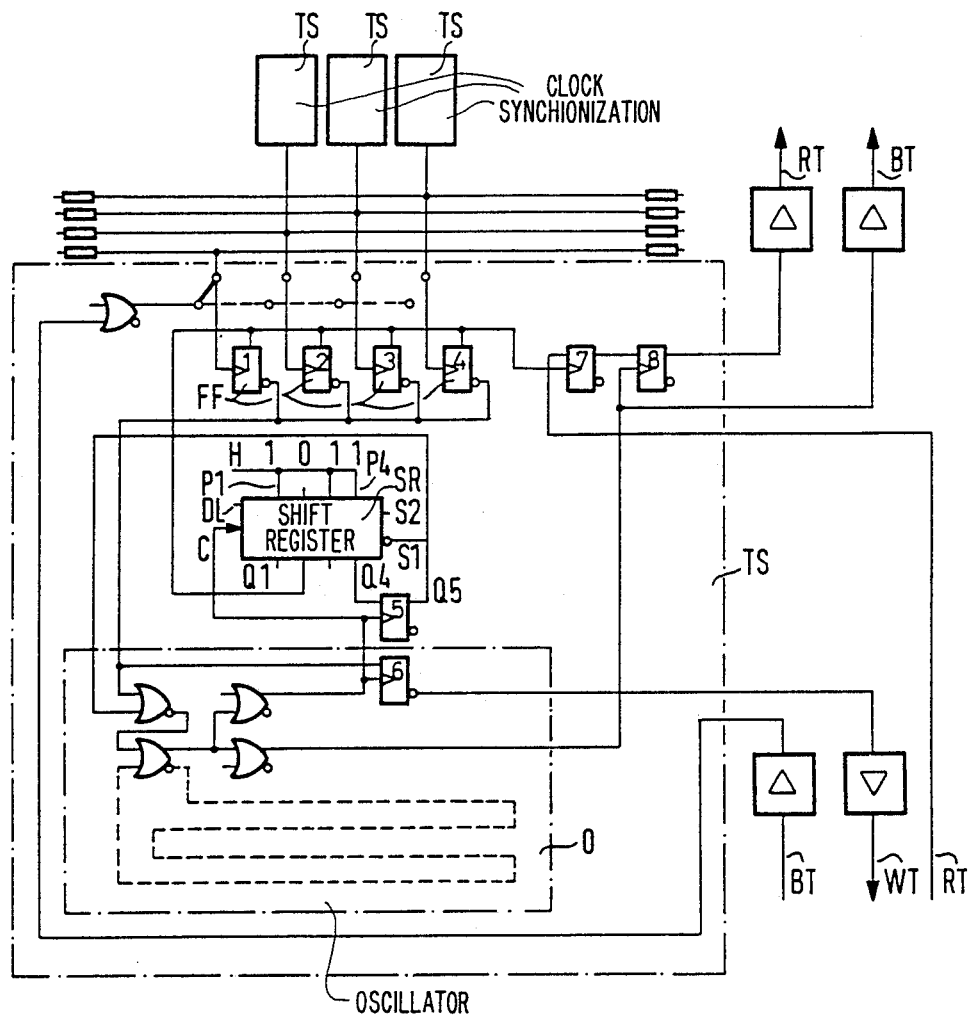
FIG. 5 shows an embodiment for effecting the clock synchronization in the shared lines equipment according to the invention.

With reference to FIG. 5 a circuit will presently be described which generates a single clock from the four incoming clocks and tolerates the failure of one incoming clock. The clock synchronization circuit comprises a free-running start-stop oscillator O with associated gate and trigger circuits. The start-stop oscillator O running free at 70 MHz is comprised of single gates and an adjustable delay line (having a delay of 7 ns). In this respect the optimum frequency can be set a little higher than the fourfold word clock (of 69.632 MHz, for example). This guarantees that four generated clock pulses exactly match one word clock with a small blanking interval at the end which, however, does not affect the data processing.

The oscillator O is started by one of the four flipflops FF, each being triggered by one interface circuit H2i (plate). These trigger signals are given through the internal bus system RB in all four interface circuits H2i, whilst the drawn-in bridge for the clock coupling can be selected differently for each interface circuit H2i.

The firt incoming clock of an interface circuit H2i starts the oscillator O. A shift register SR to which is applied the bit sequence 1011, is connected to the oscillator O and the set input of the flipflops FF. Because of this choice of the bit sequence the four flipflops FF are returned to their start positions after the second clock and thus prepared for the next clock synchronization. If after three clocks a signal with the logic "0" - level appears at output Q5, the shift register SR is loaded again with the bit sequence 1011 in the fourth clock and thus stops the oscillator O again. The incoming frame clock RT is temporarily stored with the set pulse of the flipflops FF and synchronized with the first 70 MHz clock and conveyed to the bus system RB. The start pulse of the oscillator O is temporarily stored with the first clock and returned again as a reversed word clock to the central wideband switching network Z.

What is claimed is:

1. Apparatus for shared lines for a B-ISDN switching system having subscriber stations, wideband concentrators and a central wideband switching network, the apparatus comprising: wideband concentrators (K) of a modular structure, which each include:
   (a) an internal bus system (RB) and
   (b) an interface circuit (H2i) for coupling with the central wideband switching network (Z), so that the wideband concentrators communicate with the central wideband switching network via the internal bus system and the interface circuit.

2. The apparatus of claim 1, wherein
   (a) the wideband concentrators each comprise at least one concentrator module (C) which includes:
      (i) two memory banks (A,B);
      (ii) a serial to parallel converter (S/P);
      (iii) a parallel-to-serial converter (P/S), the two memory banks communicating with the internal bus system via the serial-to-parallel and parallel-to-serial converter,
      (iv) an H1 interface circuit (H1SS) for communicating between the two memory banks and a subscriber group circuit (TG),
      so that during each frame period data are written to only one of the two memory banks and data are only read out from the other of the two memory banks.

3. Apparatus for shared lines for a B-ISDN switching system which includes subscriber stations and a central wideband switching network, the apparatus comprising a least one wideband concentrator (K) for coupling between the subscriber stations and the central wideband switching network, each wideband concentrator comprising:
   (a) at least one internal bus system (RB);
   (b) at least one interface circuit (H2i) for coupling with the central wideband switching network (Z); and
   (c) at least one concentrator module (C) which includes:
      (i) two memory banks (A,B);
      (ii) a serial-to-parallel converter (S/P);
      (iii) a parallel-to-serial converter (P/S), the two memory banks communicating with the internal bus system via the serial-to-parallel and parallel-to-serial converters; and
      (iv) an H1 interface circuit (H1SS) for communicating between the two memory banks and a subscriber group circuit (TG);
      so that during each frame period data are written to only one of the two memory banks and data are only read out from the other of the two memory banks and so that the wideband concentrator communicates via the internal bus system and the interface circuit to the central wideband switching network.

4. The apparatus of claim 3 wherein each of the two memory banks is a double memory bank.

5. The apparatus of claim 3 wherein:

(a) each such concentrator module further comprises a control circuit (ST); and
(b) the one of the two memory banks has two modes:
  (i) a first, counter-addressed mode for receiving data to be written to the one of the two memory banks from the bus system; and
  (ii) a second, addressed mode in which the control circuit reads out data from the one of the two memory banks using a clock signal reduced by an integral factor.

6. The apparatus of claim 3 wherein each such concentrator module (C) includes a bus access circuit (B-SE) for controlling access of the concentrator module to the internal bus system.

7. The apparatus of claim 3 wherein each such concentrator module (C) which includes
(a) a switch (S) coupled with the two memory banks; and
(b a loop circuit (S-OE) for controlling the switch.

8. The apparatus of claim 3 comprising n interface circuits (H2i) and n internal bus systems (RB), so that the apparatus is arranged according to the (n,k) concept, where k and n are integers.

9. The apparatus of claim 7, further comprising an elastic store (ES) connected to the H1 interface circuit (H1SS) and the switch (S).

10. The apparatus of claim 9 wherein each such concentrator module transmits a free signal through the H1 interface in the direction of a subscriber group circuit if a time channel is not occupied.

11. The apparatus of claim 7, wherein each such concentrator module further comprises a delay element (V) coupled between the two memory banks.

12. The apparatus of claim 11 wherein the delay element comprises a plurality of D flipflops.

13. The apparatus of claim 8 further comprising a plurality of concentrator time stages, one for each internal bus system.

14. The apparatus of claim 13, further comprising at least one clock synchronization circuit (TS) each connected to a respective one of the internal bus systems (RB), each clock synchronization circuit comprising:
(a) a free-running start-stop oscillating (O) and
(b gate and trigger circuits connected to the oscillator.

15. The apparatus of claim 14, wherein
the clock synchronization circuit further comprises four flipflops (FF) connected to the respective one of the internal bus systems; and
the oscillator (O) has an adjustable delay line and the oscillator (O) is triggered by one of the four flipflops.

16. The apparatus of claim 15, further comprising a shift register (SR) coupled to receive a bit sequence "1011" and connected to the oscillator (O) and a set input of the flipflops. (FF).

* * * * *